UNITED STATES PATENT OFFICE.

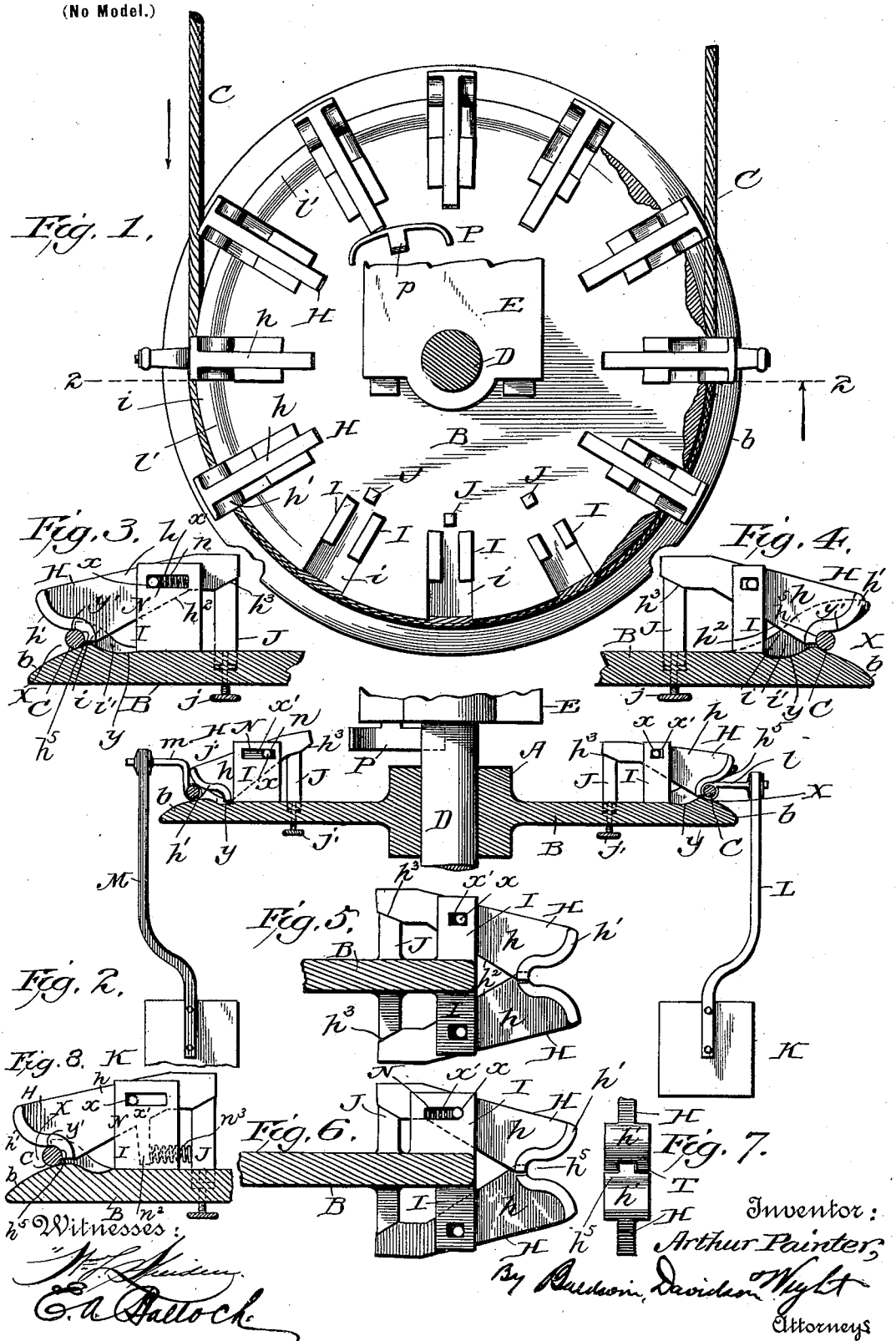

ARTHUR PAINTER, OF NELSON, CANADA.

GRIP-PULLEY.

SPECIFICATION forming part of Letters Patent No. 639,762, dated December 26, 1899.

Application filed March 15, 1899. Serial No. 709,181. (No model.)

*To all whom it may concern:*

Be it known that I, ARTHUR PAINTER, a citizen of the United States, residing at Nelson, British Columbia, Canada, have invented certain new and useful Improvements in Grip-Pulleys, of which the following is a specification.

My invention relates to that class of pulleys which are used for supporting and guiding ropes or cables employed in endless carriers or tramways. In tramways for transporting ore, &c., the rope or cable is usually supported and guided by pulleys, the tramway being generally on an incline and operated by gravity. It is customary to provide brakes for controlling the speed of the cable, and these brakes are commonly applied to the pulley at the upper end of the inclined carrier.

The object of my invention is to provide a grip-pulley to which brakes may be applied and which is so constructed that it will securely grip the cable and hold it under control. Loading-buckets are commonly suspended from the cable by means of clips. There are two forms of clip in use. One of them, which is most commonly used, consists of a straight laterally-projecting arm which is secured to the cable. The other consists of an L-shaped arm the end of which is secured to the cable.

I have provided a grip-pulley which is provided with gripping-arms adapted to grasp the cable while traveling and to permit the clips to pass, one form of gripping-arm being adapted for use in connection with clips with straight arms, and the other form of gripping-arm being adapted for use in connection with clips having L-shaped or bent arms.

In the accompanying drawings, Figure 1 is a plan view of a grip-pulley embodying my improvements. On the right-hand side of the pulley I have shown gripping-arms adapted for use in connection with clips having straight arms, and on the other side I have shown gripping-arms adapted for use in connection with clips having L-shaped or bent arms. Some of the parts of the pulley are broken away the better to illustrate other parts. Fig. 2 is a vertical central section on the line 2 2 of Fig. 1. This figure also shows the suspended loading-buckets. Fig. 3 is a detail view, on an enlarged scale, showing the details of construction of one of the gripping-arms used with a clip having an L-shaped arm. Fig. 4 is a similar view of a gripping-arm used with a clip having a straight arm. Fig. 5 is a detail view showing a modification in which a pair of gripping-arms is employed instead of a single arm and where the arms are for use in connection with clips having straight arms. Fig. 6 is a similar view showing a pair of arms adapted for use in connection with clips having L-shaped arms. Fig. 7 is a front elevation of a pair of gripping-arms, showing the meeting edges provided with a tenon or dovetail connection. Fig. 8 shows a modification.

The hub A of the pulley is provided with a circular disk or spider B, which at its periphery $b$ is formed with a groove X to receive the rope or cable C. The form of the groove will be best understood by reference to Fig. 1. The pulley is mounted on a vertical shaft D, mounted in suitable bearings E. At suitable distances apart around the periphery of the pulley I mount a series of gripping-arms H. Each of these arms consists of a main body portion $h$ and an enlarged head $h'$. The body portion $h$ is pivoted between brackets or standards I, secured to the top of the pulley. The lower edge of the arm is inclined at $h^2$, and at $h^3$ it is provided with a steeper incline resting on a lug or block J, projecting upwardly from the disk or spider B. The upper end of the lug J is inclined correspondingly with the incline $h^3$, and this lug may be made adjustable to compensate for wear by means of a set screw or bolt $j$. The headed portions of the gripping-arms extend into recesses $i$, formed in the flange $i'$, which bounds the upper part of the annular groove of the pulley. These recesses are shown clearly at the lower part of Fig. 1, the gripping-arms being removed to illustrate this feature and also to show more clearly the arrangement of the brackets I and the lugs or blocks J. When the arms are very close together, the flange I' may be omitted.

On the right-hand side of Fig. 2 I have shown a loading-bucket K, provided with a clip L, having a straight laterally-projecting arm $l$, and this arm is secured to the cable C.

Where a straight arm, such as $l$, is employed, the arrangement of the gripping-arms is somewhat different from that employed where an L-shaped arm, such as $m$, (shown on the left-hand side of Fig. 2,) is used. I will first describe the arms employed for a clip such as shown at L. The gripping-arms for this purpose are mounted between the brackets I, as above described, and their rear ends rest upon lugs or blocks J, as before explained. The pivots $x$ of the arms extend through openings $x'$ in the brackets. These openings are but slightly elongated, so that the arms will have very little radial movement, only sufficient to allow the gripping-arms to move on their pivots and to grip the cable. The cable presses against the curved or recessed end $h^5$ of the gripping-arm, forcing it inwardly, which also causes its outer end to move downwardly and grip the cable. When the arm moves inwardly, the inclined inner end $h^3$ slides up on the inclined surface of the lug J, which raises it, the arm turning on its pivot, and the outer end is forced downwardly and firmly grips the cable. Where a clip such as L is employed, it can readily pass by the gripping-arms without interfering with the operation of the mechanism.

In the construction shown it will be observed that the cable travels in the groove X, formed by the inclined or beveled edge $b$ of the disk or spider B and the flange $i$. It also travels between the beveled edge $b$ and the curved heads of the gripping-arms. The periphery of the pulley is slightly recessed at $y$ in an annular groove to permit the lower front edges of the gripping-arms to move inwardly to the desired extent.

Where clips such as M, with L-shaped or bent arms $m$, are employed, it is necessary to modify the arrangement of the gripping-arms. If, for instance, a clip such as M were used in connection with gripping-arms arranged in the same manner as shown on the right-hand side of Figs. 1 and 2, the arms $m$ of the clips would strike against the heads of the gripping-arms and would prevent the cable from being gripped by the arms, and, furthermore, the cable would be held out away from the arms and out of the groove of the pulley. In order to prevent this, I form slots N in the brackets I and mount the pivots $x$ of the gripping-arms in these slots. I also interpose between the pivots $x$ and the inner wall of the slots spiral springs $n$, which tend to move the arms outward radially, but which permit the arms to be moved inward radially when the clips are passing. Instead of placing the spring in the slot, as indicated in Fig. 3, I may provide the arm H with a downwardly-extending lug $n^2$, against the inner lower end of which presses a spring $n^3$, as shown in Fig. 8, the spring $n^3$ bearing at its inner end against the lug or block J. The headed end $h'$ of the gripping-arm is so shaped that it fits the cable C when there is no clip opposite it, as shown in Fig. 3. It is also so shaped as to grip the cable when the clip M is passing, as indicated in Fig. 2. As there shown, the gripping-arm H is moved backward a considerable distance, the pivots $x$ having been moved backward in the slots N against the force of the springs $n$ and the rear ends of the gripping-arms having been raised on the lugs or blocks J. The lower ends of the headed portions also have been made to enter the groove $y$. At the same time the curved portions $y'$ of the heads of the gripping-arms are made to press against the cable, or that portion of the clip which surrounds the cable. In this way clips such as M may pass the gripping-arms easily and without causing the cable to leave the groove of the pulley. As soon as the clips have passed the gripping-arms are moved outward to their normal position by means of the springs $n$.

I may employ a cam-rail P for moving the gripping-arms outwardly. This cam-rail is of only sufficient length to act on one gripping-arm at a time. It is preferably of the curved form shown, and it has an arm $p$ for securing it to the frame which supports the bearings of the pulley. It is so arranged that if the gripping-arms are moved inward when they arrive at the rail they are pressed outwardly thereby when passing the rail. When a cam-rail, such as P, is employed, I may dispense with the use of the springs $n$, as these are for the purpose of returning the gripping-arms to their normal outward position. The cam-rail effects the same purpose.

In the construction heretofore described gripping-arms are arranged on only one side of the pulley; but I may have gripping-arms on opposite sides thereof, as indicated in Figs. 5, 6, and 7. Fig. 5 indicates a pair of gripping-arms suitable for use in connection with a clip such as L. In this figure, B indicates the disk of the pulley, I the brackets or standards, to which the gripping-arms H are pivoted, and J the lugs or blocks for guiding the arms. The pivots $x$ extend into openings $x'$ in the brackets I which need not be elongated, as it is necessary for the arms to have but slight radial movement.

In Fig. 6, B indicates the disk of the pulley; I, the brackets or standards; H, the gripping-arms, and J the lugs or blocks for guiding the arms. In this case the pivots $x$ of the upper gripping-arm work back and forth in elongated slots $x'$ in the brackets I. Springs $n$ may be employed for returning the arm to its outward position. Only the upper arms H need be made to move radially, as the clip only comes in contact with the upper arm. The lower gripping-arm H may have a stationary pivot or one having but very slight radial movement. In order to produce steadiness and rigidity, I may form the meeting ends of the arms with a tongue-and-groove connection, such as indicated at T in Fig. 7. A tongue-and-groove connection may also be employed when only a single gripping-arm is used.

I have shown several modifications of the invention, and in Figs. 1 and 2 I have shown two different forms of gripping-arms. It will be understood, of course, that only one form of the invention is necessary to be used at one time. I have simply shown in Fig. 1 two species of the invention for convenience of illustration. The details of construction may be varied. Such parts as are subject to wear may be made so as to be readily replaced, and the particular form of the elements of the combinations may be changed within such limits as will not interfere with the method of operation above described.

I claim as my invention—

1. A grip-pulley, comprising a disk or spider and a series of gripping-arms carried thereby which move about pivots and also radially, and which have inclined lower ends engaging lugs projecting from the disk or spider, and means for adjusting the lugs vertically.

2. The combination of the disk or spider, the gripping-arms, brackets projecting from the disk and provided with slots at their upper ends, pivotal studs projecting from the gripping-arms into the slots, and lugs projecting from the pulley which engage the lower sides of the gripping-arms.

3. The combination of the grip-pulley having a grooved periphery, and an annular groove, $y$, in the face of the pulley, a series of gripping-arms arranged radially about the pulley and pivoted to brackets projecting therefrom, lugs engaging the inner ends of the arms, pivot-studs for the arms projecting into slots in the standards projecting from the pulley, and means for moving the arms radially outward.

4. A grip-pulley provided with a pair of gripping-arms arranged in the same vertical plane on opposite sides of the pulley, brackets projecting from the pulley to which the gripping-arms are pivoted, and lugs projecting from the pulley and having inclined ends engaging inclined surfaces on the inner ends of the gripping-arms.

In testimony whereof I have hereunto subscribed my name.

ARTHUR PAINTER.

Witnesses:
 A. M. JOHNSON,
 JAS. O'SHEA.